US012643520B2

(12) United States Patent
Bonalumi et al.

(10) Patent No.: US 12,643,520 B2
(45) Date of Patent: Jun. 2, 2026

(54) METHOD OF CONTROLLING A BRAKING SYSTEM AND RELATED BRAKING SYSTEM

(71) Applicant: BREMBO S.p.A., Curno (IT)

(72) Inventors: Eugenio Bonalumi, Curno (IT);
Alfonso Tarantini, Curno (IT)

(73) Assignee: Brembo S.p.A., Curno (IT)

( * ) Notice: Subject to any disclaimer, the term of this patent is extended or adjusted under 35 U.S.C. 154(b) by 81 days.

(21) Appl. No.: 18/850,099

(22) PCT Filed: Mar. 24, 2023

(86) PCT No.: PCT/IB2023/052903
§ 371 (c)(1),
(2) Date: Sep. 24, 2024

(87) PCT Pub. No.: WO2023/180997
PCT Pub. Date: Sep. 28, 2023

(65) Prior Publication Data
US 2025/0214553 A1     Jul. 3, 2025

(30) Foreign Application Priority Data

Mar. 25, 2022    (IT) ......................... 102022000005951

(51) Int. Cl.
*B60T 13/74* (2006.01)
*B60T 17/22* (2006.01)
(52) U.S. Cl.
CPC ............ *B60T 13/741* (2013.01); *B60T 17/22* (2013.01); *B60T 2201/10* (2013.01); *B60T 2270/82* (2013.01)
(58) Field of Classification Search
CPC .... B60T 13/741; B60T 17/22; B60T 2201/10; B60T 2270/82; B60T 7/107; B60T 7/12;
(Continued)

(56) References Cited

U.S. PATENT DOCUMENTS 8,758,093 B2 *  6/2014  Ochi .................... B23F 23/1225
                                                    451/72
2005/0039989 A1 *  2/2005  Huang .................. B60T 11/046
                                                    188/26
(Continued)

FOREIGN PATENT DOCUMENTS

FR          3097605 A1    12/2020
WO      WO-2006001038 A1 *  1/2006    ....... B23B 31/16116
(Continued)

OTHER PUBLICATIONS

European Patent Office, International Search Report, issued in PCT/IB2023/052903, Jun. 16, 2023, Rijswijk, NL.

*Primary Examiner* — Joseph J Dallo
(74) *Attorney, Agent, or Firm* — Marshall & Melhorn, LLC

(57) ABSTRACT

A method of controlling a braking system of a vehicle for activating a parking-braking force actuated by the braking system is provided. The method involves actuating both a first actuator approaching against a first pad to apply a first force and the second actuator approaching against a second pad to apply a second force, detecting a value of the first force and the second force, synchronizing an application of the first force and the second force on a brake disc, and continuing the actuation of the first actuator and the second actuator until a first predetermined force value is reached by the first force and a second predetermined force value is reached by the second force, and stopping the first actuator and second actuators by an electronic processing unit.

13 Claims, 2 Drawing Sheets

Figures 1, 2:
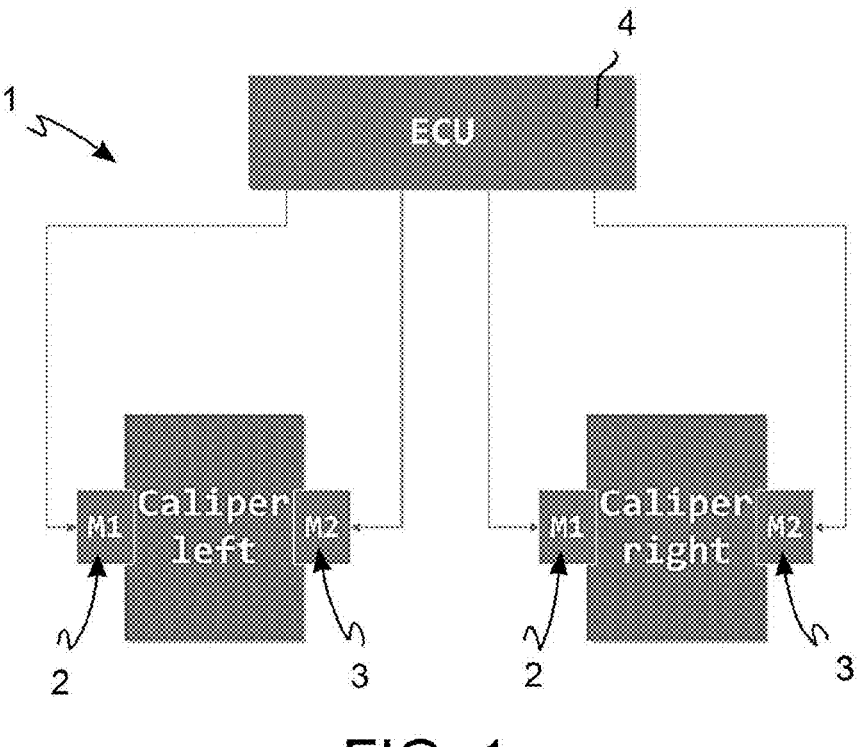

(58) Field of Classification Search
CPC .... B60T 8/172; B60T 8/171; F16D 2066/003;
F16D 65/18; F16D 2066/005; F16D
55/228; B60Y 2400/81
See application file for complete search history.

(56) References Cited

U.S. PATENT DOCUMENTS

| | | | |
|---|---|---|---|
| 2005/0199165 A1* | 9/2005 | Friman | D05B 47/04 |
| | | | 112/470.01 |
| 2012/0085598 A1 | 4/2012 | Dennis | |
| 2014/0318719 A1* | 10/2014 | Hsieh | E05F 15/72 |
| | | | 160/133 |
| 2016/0238094 A1 | 8/2016 | Gutelius et al. | |
| 2018/0106309 A1* | 4/2018 | Fricke | F16D 65/0068 |
| 2019/0070699 A1* | 3/2019 | Itou | B23Q 1/5437 |

FOREIGN PATENT DOCUMENTS

| | | | | |
|---|---|---|---|---|
| WO | WO-2014114747 A2 * | 7/2014 | | F16D 66/027 |
| WO | WO-2014184112 A1 * | 11/2014 | | F16D 55/02 |
| WO | WO-2019206577 A1 * | 10/2019 | | F16D 66/021 |
| WO | 2021019380 A1 | 2/2021 | | |

* cited by examiner

METHOD OF CONTROLLING A BRAKING SYSTEM AND RELATED BRAKING SYSTEM

FIELD OF THE INVENTION

The present invention relates to a method of controlling a braking system, in particular of a vehicle, and to a braking system of a vehicle.

BACKGROUND ART

Motorcars and in general vehicles with more than two wheels intended to transport passengers on roads, are provided with a hand parking brake, the function of which is to lock the wheels of the vehicle thus preventing the movement thereof when it is parked.

In modern braking systems, e.g., those provided with electronic Brake-By-Wire (BBW) technology, the hand parking brake is replaced by an Electric Parking Brake (EPB).

For all intents and purposes, the EPB electric parking brake can be considered a sub-system of an electronic braking system with BBW technology which is used for service braking.

In greater detail, using the EPB subsystem, the driver can activate the wheel-locking mechanism by means of an actuating device, such as an appropriate button or other automatic functions managed by an electronic processing unit, such as signal logics related to the ignition key, the gear engagement, and the accelerator pedal that, once activated, sends a request for parking-braking activation to an electronic control unit of the vehicle, which electrically actuates the brake pads to lock the brake discs and therefore the movement of the vehicle.

Vice versa, when restarting, the driver can deactivate the wheel locking mechanism by means of an actuating device that, once activated, sends a parking-braking deactivation request to an electronic control unit of the vehicle, which electrically actuates the brake pads to unlock the brake discs and therefore the movement of the vehicle.

Moreover, in addition to replacing the parking-braking function traditionally performed by the hand parking brake, the EPB subsystem is configured to provide automatic supporting functions to the driver, including the so-called "AutoHold" function, i.e., the function allowing the wheels to be locked automatically and without the driver's request when the vehicle is stationary, e.g., uphill, and to be released as soon as the driver presses the accelerator pedal of the vehicle.

In known disc brakes with fixed brake caliper, the two pads opposite to the brake disc are actuated by respective pistons independently actuatable by at least two actuators, at least one actuator of which being on each side of the brake disc.

The at least two opposite actuators are independently controlled by the electronic control unit, therefore they are actuatable and controllable at the same time and independently of each other.

For each of the two actuators, the activation of the parking braking according to a known control logic can be divided into three successive steps:

an inrush step, which elapses from the instant in which the electronic control unit commands the actuators, positioned at a given starting position, to begin a movement, to the instant in which the actuator starts to move, without applying any braking force to the corresponding pad;

an approaching step, which elapses from the instant in which the actuators start to move, without applying any braking force to the corresponding pad, to the instant in which the actuators make contact with the pad and start to apply a braking force to the pad;

an application step, which elapses from the instant in which the actuators start to apply and increase the braking force acting on the pad, to the instant in which the braking force applied by the actuators to the pad reaches a given predetermined reference value.

In the known control logics, the at least two opposite actuators are configured to start the inrush step of the parking-braking activation process at the same time in order to activate an axial thrust on the two opposite faces of the brake disc being as symmetrical as possible.

Such a symmetry is required to minimize the stresses acting on the brake disc, which could lead to cracks, damage, or rupture of the brake disc.

In known disc brakes having at least two independently controllable opposite actuators, the wear, deterioration of mechanical components, and uncertainties related to the starting position of the two opposite actuators may result in differences in the actuation of the braking force by these two actuators, with particular reference to the time required for the two actuators to approach the respective pad and apply the respective braking force, thus generating approaching steps of different duration.

If the duration of the approaching step of one actuator differs from the duration of the approaching step of the opposite actuator, the two actuators can start to apply a braking force but not at the same time, so that undesired and harmful asymmetric axial thrusts act on the brake disc.

SUMMARY OF THE INVENTION

It is the object of the present invention to provide a method of controlling a braking system and a braking system such as to obviate at least some of the drawbacks of the prior art.

It is a particular object of the present invention to provide a method of controlling a braking system and a braking system such as to minimize the asymmetric axial thrusts actuated on the brake disc during the activation of the parking braking.

It is a further particular object of the present invention to provide a control method of a braking system and a braking system configured to perform the control method, simplified and such as to have fewer energy and structural constraints.

These and other objects are achieved by a method of controlling a braking system and a braking system according to the independent claims.

The dependent claims relate to preferred and advantageous embodiments of the present invention.

DRAWINGS

Figure 3:
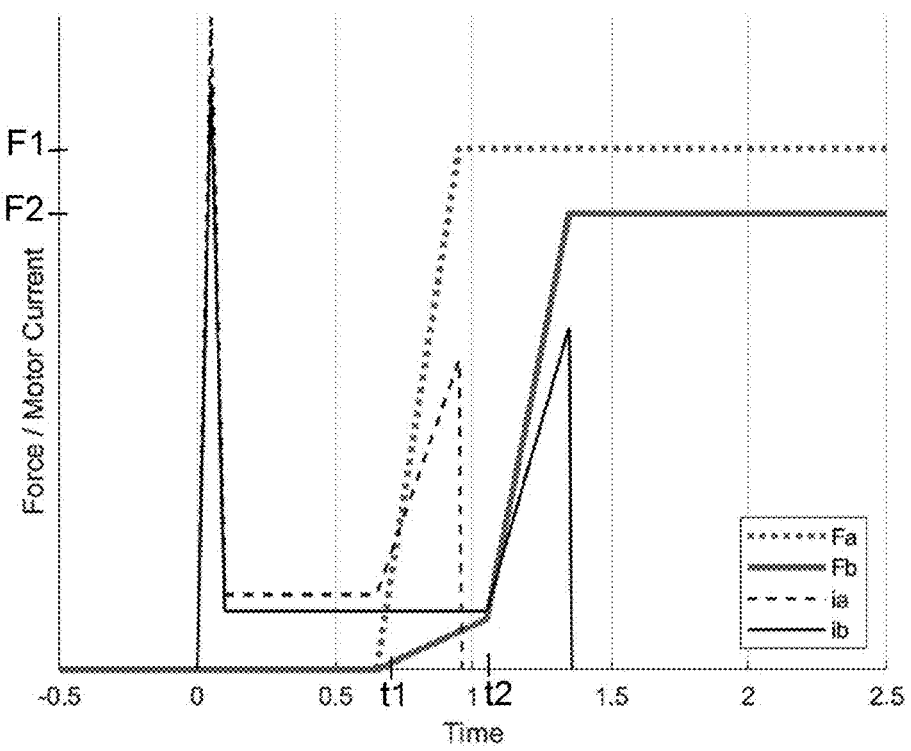
Figure 4:
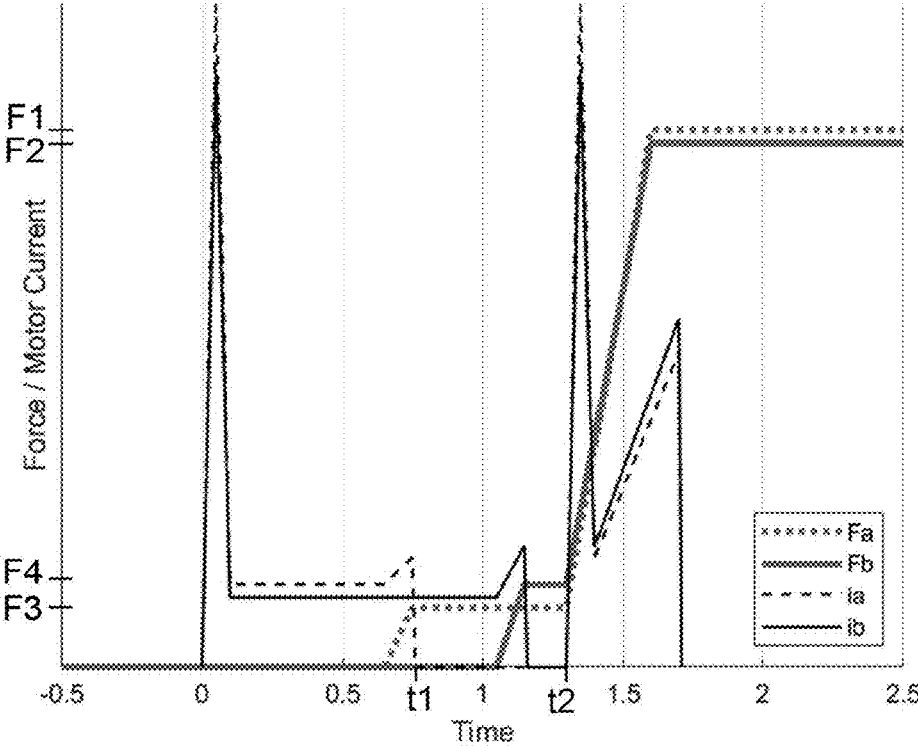

In order to better understand the invention and appreciate the advantages thereof, some non-limiting exemplary embodiments thereof will be described below with reference to the accompanying drawings, in which:

FIG. 1 diagrammatically shows a braking system, according to an embodiment of the invention;

FIG. 2 diagrammatically shows a supply current of a braking system actuator, and the respective force actuated on a pad of the same braking system, according to an embodiment of the invention;

FIG. 3 diagrammatically shows the supply currents and the respective forces actuated by two independently controllable actuators of a brake caliper of a braking system, according to the prior art;

FIG. 4 diagrammatically shows the supply currents and the respective forces actuated by two independently controllable actuators of a brake caliper of a braking system, according to an embodiment of the invention.

DETAILED DESCRIPTION

A method of controlling a braking system 1 of a vehicle for activating a parking-braking force actuated by the braking system 1 is described below with reference to the figures.

The braking system 1 is of the type comprising at least:

a brake disc;

a first pad and a second pad spaced apart from each other and positioned to be opposite to the brake disc;

a first actuator 2, configured to apply and release a first force Fa on the first pad so as to move the first pad from an open position, in which the first pad is separated from the brake disc and does not actuate a parking-braking force, to a closed position, in which the first pad is biased against the brake disc and actuates a parking-braking force;

a second actuator 3, configured to apply a second force Fb on the second pad so as to move the second pad from an open position, in which the second pad is separated from the brake disc and does not actuate a braking force, to a closed position, in which the second pad is biased against the brake disc and actuates a parking-braking force;

an electronic processing unit 4, configured to control the actuation of the first actuator 2 and the second actuator 3;

detection means, operatively connected to the electronic processing unit 4, configured to detect, either directly or indirectly, the value of the first force Fa actuated by the first actuator 2 on the first pad, and to detect, either directly or indirectly, the value of the second force Fb actuated by the second actuator 3 on the second pad.

The method comprises the steps of:

actuating, by means of the electronic processing unit 4, both the first actuator 2 approaching against the first pad to apply the first force Fa and increase the value of the first force Fa, and the second actuator 3 approaching against the second pad to apply the second force Fb and increase the value of the second force Fb;

detecting, during the actuation of the first actuator 2 and the second actuator 3, and by the detection means, the value of the first force Fa and the second force Fb;

synchronizing the application of the first force Fa and the second force Fb on the brake disc by means of the electronic processing unit 4;

continuing the actuation of the first actuator 2 and the second actuator 3 until a first predetermined force value F1 is reached by the first force Fa and a second predetermined force value F2 is reached by the second force Fb;

stopping the first actuator 2 and the second actuator 3 by means of the electronic processing unit 4.

Furthermore, the step of synchronizing the application of the first force Fa and the second force Fb on the brake disc comprises the steps of:

in a first instant of time t1 in which it is detected, by the detection means, that the first force Fa has increased to a value being substantially greater than a third predetermined force value F3, stopping the first actuator 2, and continuing the actuation of the second actuator 3;

in a second instant of time t2 in which it is detected, by the detection means, that the second actuator 3 applies a second force Fb with a value being substantially greater than a fourth predetermined force value F4, actuating the first actuator 2.

Alternatively, the step of synchronizing the application of the first force Fa and the second force Fb on the brake disc comprises the steps of:

in a first instant of time t1 in which it is detected, by the detection means, that the second force Fb has increased to a value being substantially greater than a fourth predetermined force value F4, stopping the second actuator 3, and continuing the actuation of the first actuator 2;

in a second instant of time t2 in which it is detected, by the detection means, that the first actuator 2 applies a first force Fa with a value being substantially greater than a third predetermined force value F3, actuating the second actuator 3.

Advantageously, the control method according to the present invention minimizes the asymmetric axial thrusts actuated on the brake disc during the activation of the parking braking.

This is achieved as a result of the synchronization of the application of the first and second forces Fa, Fb on the two opposite faces of the brake disc, which synchronization is obtained by sharing between the two actuators, by means of the electronic processing unit, the detection when the contact is made between one of the two actuators with the respective pad, which results in the temporary stop of the actuator pending the next detection of contact occurred between the other of the two actuators with the respective pad.

As can be seen by comparing FIGS. 6 and 7, showing a control method according to the present invention, with FIGS. 4 and 5, showing a control method according to the prior art, the method according to the present invention drastically reduces the asymmetric axial thrusts actuated on the brake disc, i.e., reduces the difference between the opposite forces applied by the respective actuators upon completion of the activation of the parking braking.

Advantageously, the control method according to the present invention is applicable to braking systems comprising at least one fixed brake caliper.

According to an embodiment of the invention, the third predetermined force value F3 is substantially equal to the fourth predetermined force value F4.

According to an embodiment of the invention, the third predetermined force value F3 is equal to zero.

According to an embodiment, the fourth predetermined force value F4 is equal to zero.

According to an embodiment, both the third predetermined force value F3 and the fourth predetermined force value F4 are equal to zero.

According to an embodiment of the invention, both the first predetermined force value F1 and the second predetermined force value F2 are greater than the third predetermined force value F3 and the fourth predetermined force value F4.

Furthermore, the first predetermined force value F1 and the second predetermined force value F2 are equal to a force value such as to complete the activation of a parking-braking force.

According to an embodiment of the invention, the first predetermined force value F1 is substantially equal to the second predetermined force value F2.

According to an embodiment of the invention, the step of detecting, by the detection means, the value of the first force Fa comprises:

detecting, by the detection means, the angular position of the first actuator 2; and calculating, by means of the electronic processing unit 4, the value of the first force Fa based on the angular position of the first actuator 2; or detecting the value of a first supply current ia supplying the first actuator 2; and calculating, by means of the electronic processing unit 4, the value of the first force Fa based on the value of the first supply current ia supplying the first actuator 2.

According to an embodiment, the step of detecting, by the detection means, the value of the second force Fb comprises:

detecting, by the detection means, the angular position of the second actuator 3; and calculating, by means of the electronic processing unit 4, the value of the second force Fb based on the angular position of the second actuator 3; or detecting the value of a second supply current ib supplying the second actuator 3; and calculating, by means of the electronic processing unit 4, the value of the second force Fb based on the value of the second supply current ib supplying the second actuator 3.

According to an embodiment of the invention, the step of actuating, by means of the electronic processing unit 4, both the first actuator 2 approaching against the first pad to apply the first force Fa and increase the value of the first force Fa, and the second actuator 3 approaching against the second pad to apply the second force Fb and increase the value of the second force Fb, is actuated upon reception, by the electronic processing unit 4, of a parking-braking force activation request signal.

The parking-braking force activation request signal is sent by an actuating device operatively connected to the electronic processing unit 4, upon actuation of said actuating device.

The actuating device is actuatable by a user.

According to an embodiment of the invention, the method comprises, after the step of continuing the actuation of the first actuator 2 and the second actuator 3 until a first predetermined force value F1 is reached by the first force Fa and a second predetermined force value F2 is reached by the second force Fb, the step of:

sending, from the electronic processing unit 4 to a signaling device operatively connected to the electronic processing unit 4, a complete parking-braking force activation signal.

Optionally, the complete parking-braking force activation signal is viewable by a user by means of the signaling device.

According to an embodiment, the step of synchronizing the application of the first force Fa and the second force Fb on the brake disc is performed in an iterative manner. Preferably, the iteration time is between 5 and 10 ms.

According to an embodiment, during the step of synchronizing the application of the first force Fa and the second force Fb on the brake disc, the value of the first force Fa and/or the value of the second force Fb is detected every 5-10 ms.

According to a further aspect of the invention, a braking system 1 of a vehicle configured to activate a parking-braking force, comprises at least:

a brake disc;

a first pad and a second pad spaced apart from each other and positioned to be opposite to the brake disc;

a first actuator 2, configured to apply and release a first force Fa on the first pad so as to move the first pad from an open position, in which the first pad is separated from the brake disc and does not actuate a parking-braking force, to a closed position, in which the first pad is biased against the brake disc and actuates a parking-braking force;

a second actuator 3, configured to apply a second force Fb on the second pad so as to move the second pad from an open position, in which the second pad is separated from the brake disc and does not actuate a braking force, to a closed position, in which the second pad is biased against the brake disc and actuates a parking-braking force;

an electronic processing unit 4, configured to control the actuation of the first actuator 2 and the second actuator 3;

detection means, operatively connected to the electronic processing unit 4, configured to detect, directly or indirectly, the value of the first force Fa actuated by the first actuator 2 on the first pad, and to detect, either directly or indirectly, the value of the second force Fb actuated by the second actuator 3 on the second pad.

The braking system 1 is configured to activate the parking-braking force by performing a method as described above.

Advantageously, a braking system 1 thus configured allows minimizing the asymmetric axial thrusts actuated on the brake disc when activating the parking braking.

With added advantage, a braking system 1 thus configured has reduced energy and structural constraints.

Advantageously, the braking system comprises at least one fixed brake caliper.

According to an embodiment of the invention, the braking system 1 comprises an actuating device operatively connected to the electronic processing unit 4.

The electronic processing unit 4 is configured to actuate both the first actuator 2 approaching against the first pad to apply the first force Fa and increase the value of the first force Fa, and the second actuator 3 approaching against the second pad to apply the second force Fb and increase the value of the second force Fb upon reception, by the electronic processing unit 4, of a parking-braking force activation request signal.

The parking-braking force activation request signal is sent by the actuating device upon actuation of said button.

The actuating device is actuatable by a user.

Advantageously, the actuating device is positionable in the passenger compartment of the vehicle close to the position occupied by the user.

The actuating device can be, by way of example, an appropriate button, an ignition key, a gear shift actuator, an acceleration pedal or different pedal, or a device connected to automatic functions managed by the electronic processing unit 4 or an appropriate electronic processing unit.

According to an embodiment, the braking 1 comprises a signaling device operatively connected to the electronic processing unit 4.

The electronic processing unit 4 is configured to send a complete parking-braking force activation signal to the signaling device.

The parking-braking force activation signal is viewable by a user by means of the signaling device.

The signaling device can be, for example, a warning light, or a digital screen positioned inside the passenger compartment of the vehicle close to the position occupied by the user.

According to an embodiment, the detection means comprise an angular position detector, preferably an encoder, configured to detect the angular position of the first actuator 2 and/or the second actuator 3.

Alternatively or additionally, the detection means comprises a current detector, preferably an ammeter, configured to detect the value of a supply current supplying either the first actuator 2 or the second actuator 3.

The electronic processing unit 4 comprises a calculator configured to calculate the value of the first force Fa and/or the second force Fb based on the angular position of the first actuator 2 or the second actuator 3, respectively.

Alternatively or additionally, the calculator is configured to calculate the value of the first force Fa and/or the second force Fb based on the value of the supply current supplying the first actuator 2 or the second actuator 3, respectively.

Obviously, those skilled in the art will be able to make changes or adaptations to the present invention, without however departing from the scope of the following claims.

LIST OF REFERENCE SIGNS

1. Braking system
2. First actuator
3. Second actuator
4. Electronic processing unit
Fa. First force
Fb. Second force
F1. First predetermined force value
F2. Second predetermined force value
F3. Third predetermined force value
F4. Fourth predetermined force value
ia. First supply current
ib. Second supply current
t1. First time instant
t2. Second time instant

The invention claimed is:

1. A method of controlling a braking system of a vehicle for activating a parking-braking force actuated by the braking system, the braking system comprising:

a brake disc;

a first pad and a second pad spaced apart and positioned opposite the brake disc;

a first actuator configured to apply and release a first force on the first pad so as to move the first pad from an open position, in which the first pad is separate from the brake disc and does not actuate the parking-braking force, to a closed position, in which the first pad is biased against the brake disc and actuates the parking-braking force;

a second actuator configured to apply a second force on the second pad so as to move the second pad from an open position, in which the second pad is separate from the brake disc and does not actuate the parking-braking force, to a closed position, in which the second pad is biased against the brake disc and actuates the parking-braking force;

an electronic processing unit configured to control an actuation of the first actuator and the second actuator;

detection means, operatively connected to the electronic processing unit, configured to detect, either directly or indirectly, a value of the first force actuated by the first actuator on the first pad, and to detect, either directly or indirectly, a value of the second force actuated by the second actuator on the second pad, the method comprising steps of:

actuating, by the electronic processing unit, both the first actuator approaching against the first pad to apply the first force and increase the value of the first force, and the second actuator approaching against the second pad to apply the second force and increase the value of the second force;

detecting, during the actuation of the first actuator and the second actuator, by the detection means, the value of the first force and the second force;

synchronizing an application of the first force and the second force on the brake disc by the electronic processing unit;

continuing the actuation of the first actuator and the second actuator until a first predetermined force value is reached by the first force and a second predetermined force value is reached by the second force; and stopping the first actuator and the second actuator by the electronic processing unit, wherein synchronizing the application of the first force and the second force on the brake disc comprises steps of:

at a first instant of time in which the detection means detect that the first force has increased to a value greater than a third predetermined force value, stopping the first actuator, and continuing the actuation of the second actuator;

at a second instant of time in which the detection means detect that the second actuator applies the second force with a force greater than a fourth predetermined force value, actuating the first actuator;

or steps of:

at a first instant of time in which the detection means detect that the second force has increased to a value greater than a fourth predetermined force value, stopping the second actuator, and continuing the actuation of the first actuator;

at a second instant of time in which the detection means detect that the first actuator applies the first force with a force greater than a third predetermined force value, actuating the second actuator.

2. The method of claim 1, wherein the third predetermined force value is substantially equal to the fourth predetermined force value.

3. The method of claim 1, wherein the third predetermined force value is zero, and/or wherein the fourth predetermined force value is zero.

4. The method of claim 1, wherein both the first predetermined force value and the second predetermined force value are greater than the third predetermined force value and the fourth predetermined force value, and wherein the first predetermined force value and the second predetermined force value are equal to a force value of sufficient magnitude to complete an activation of the parking-braking force.

5. The method of claim 4, wherein the first predetermined force value is equal to the second predetermined force value.

6. The method of claim 1, wherein the step of detecting, by the detection means, the value of the first force comprises:

detecting an angular position of the first actuator by the detection means; and calculating the value of the first force from the angular position of the first actuator by the electronic processing unit;

or detecting a value of a first supply current which powers the first actuator; and calculating, by the electronic processing unit, the value of the first force based on the value of the first supply current which powers the first actuator.

7. The method of claim 1, wherein the step of detecting, by the detection means, the value of the second force comprises:

detecting an angular position of the second actuator by the detection means; and calculating the value of the second force from the angular position of the second actuator by the electronic processing unit;

or detecting a value of a second supply current which powers the second actuator; and calculating, by the electronic processing unit, the value of the second force based on the value of the second supply current which powers the second actuator.

8. The method of claim 1, wherein the step of actuating, by the electronic processing unit, both the first actuator approaching against the first pad to apply the first force and increase the value of the first force, and the second actuator approaching against the second pad to apply the second force and increase the value of the second force is actuated upon reception, by the electronic processing unit, of a parking-braking force activation request signal, wherein the parking-braking force activation request signal is sent by an actuation device operatively connected to the electronic processing unit, upon actuation of said actuating device, said actuating device being actuatable by a user.

9. The method of claim 1, further comprising, after the step of continuing the actuation of the first actuator and the second actuator until the first force reaches the first predetermined force value and the second force reaches the second predetermined force value, a step of:

sending, from the electronic processing unit to a signaling device operatively connected to the electronic processing unit, a parking-braking force complete activation signal, wherein the parking-braking force complete activation signal is viewable by a user by means of the signaling device.

10. The method of claim 1, wherein, during the step of synchronizing the application of the first force and the second force on the brake disc, the value of the first force and/or the value of the second force is detected every 5-10 ms.

11. A braking system of a vehicle configured to activate a parking-braking force, the braking system comprising:

a brake disc;

a first pad and a second pad spaced apart and positioned opposite the brake disc;

a first actuator configured to apply and release a first force on the first pad so as to move the first pad from an open position, in which the first pad is separate from the brake disc and does not actuate the parking-braking force, to a closed position, in which the first pad is biased against the brake disc and actuates the parking-braking force;

a second actuator configured to apply a second force on the second pad so as to move the second pad from an open position, in which the second pad is separate from the brake disc and does not actuate the parking-braking force, to a closed position, in which the second pad is biased against the brake disc and actuates the parking-braking force;

an electronic processing unit configured to control an actuation of the first actuator and the second actuator;

detection means, operatively connected to the electronic processing unit, configured to detect, either directly or indirectly, a value of the first force actuated by the first actuator on the first pad, and to detect, either directly or indirectly, a value of the second force actuated by the second actuator on the second pad, wherein the braking system is configured to activate the parking-braking force by performing the method of claim 1.

12. The braking system of claim 11, further comprising an actuating device operatively connected to the electronic processing unit, wherein the electronic processing unit is configured to actuate both the first actuator approaching against the first pad to apply the first force and increase the value of the first force, and the second actuator approaching against the second pad to apply the second force and increase the value of the second force upon reception, by the electronic processing unit, of a parking-braking force activation request signal, wherein the parking-braking force activation request signal is sent by the actuating device upon actuation of said actuating device, and wherein said actuating device is actuatable by a user.

13. The braking system of claim 11, wherein the braking system further comprises a signaling device operatively connected to the electronic processing unit, wherein the electronic processing unit is configured to send a parking-braking force complete activation signal to the signaling device, and wherein the parking-braking force complete activation signal is viewable by a user by means of the signaling device.

\*    \*    \*    \*    \*